June 19, 1951     T. C. GEORGE     2,557,426
TAB ACTUATING MECHANISM
Filed Jan. 13, 1950     2 Sheets-Sheet 1
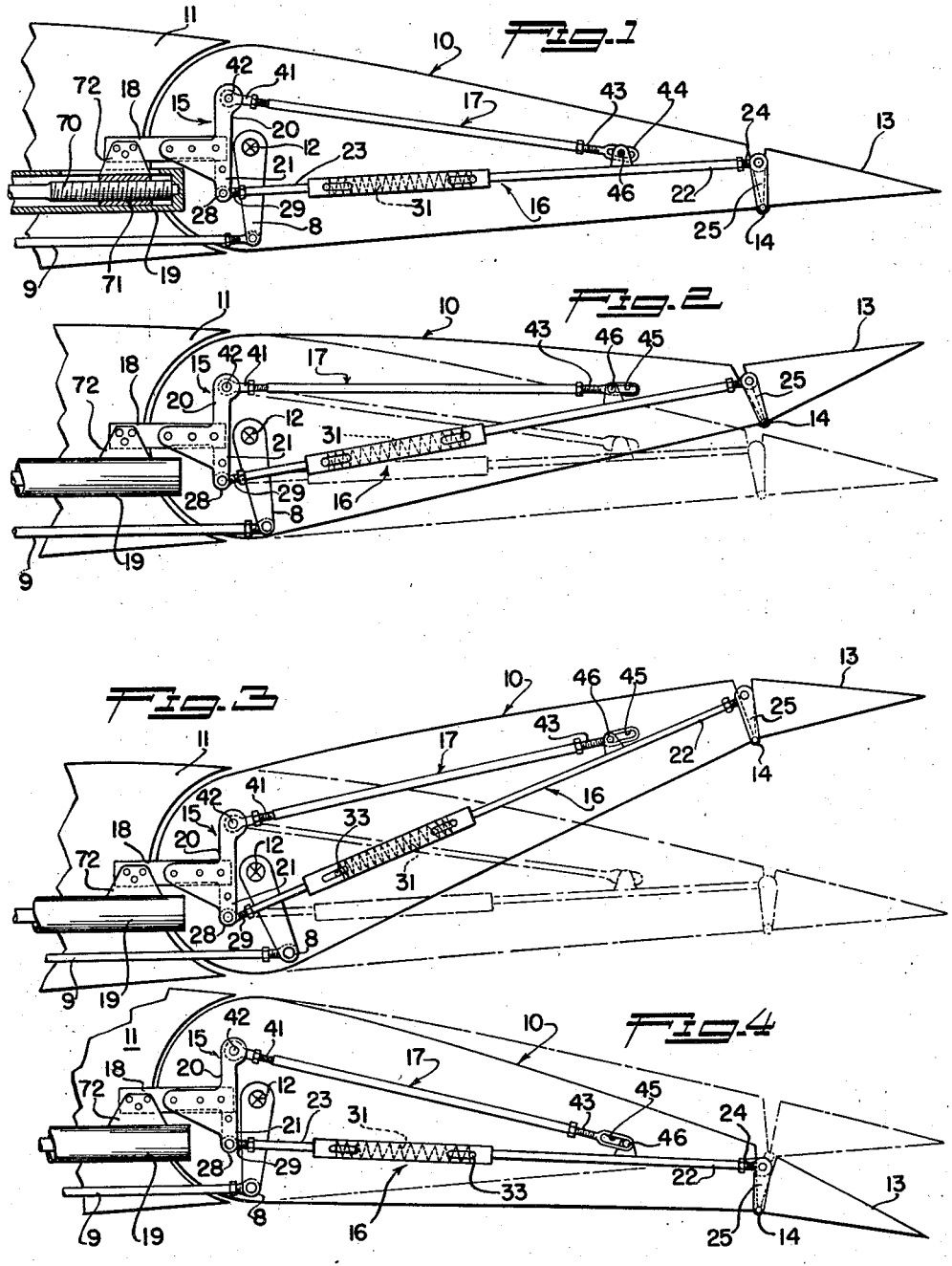
INVENTOR.
THOMAS C. GEORGE
BY
*George C. Sullivan*
Agent

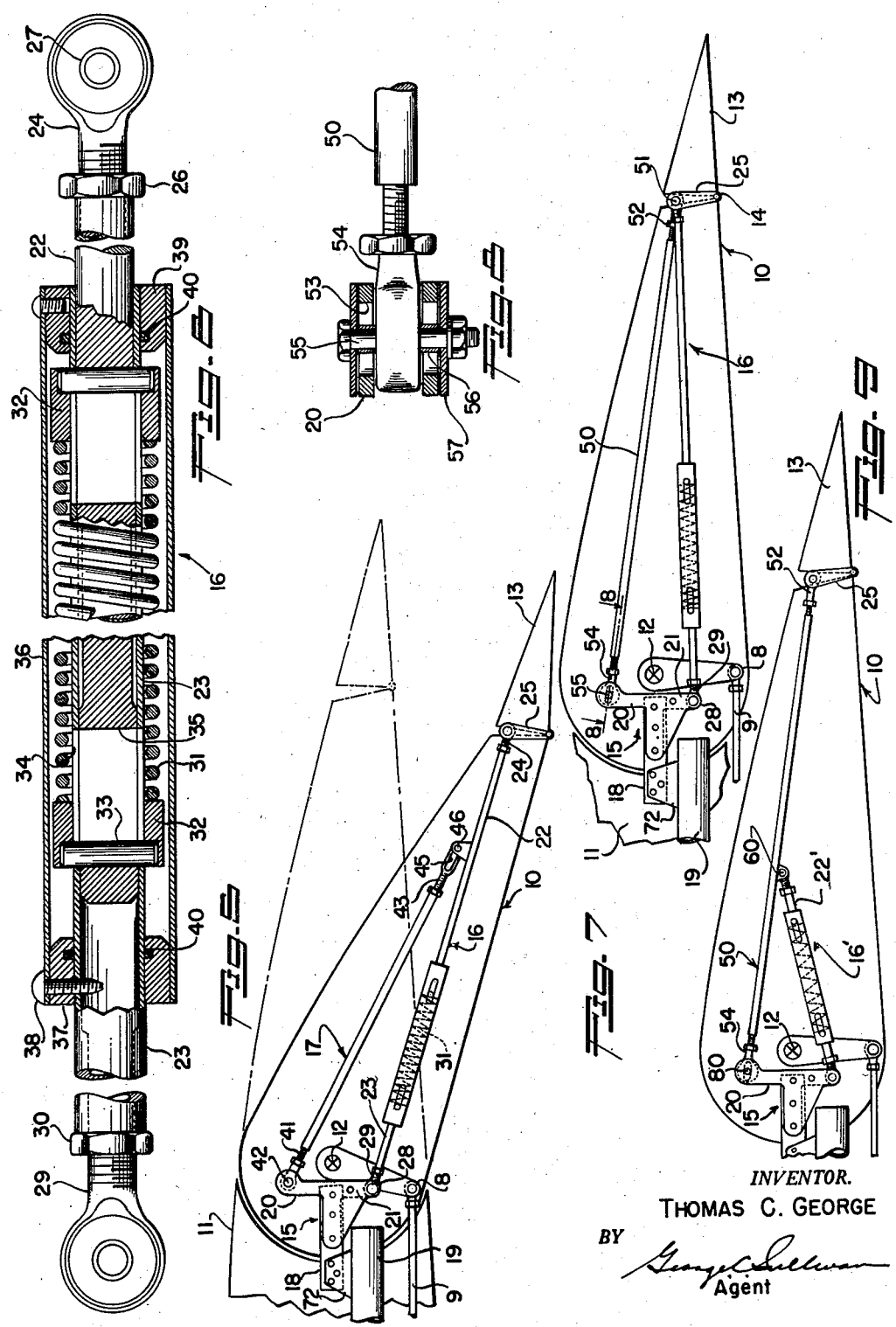

Patented June 19, 1951

2,557,426

UNITED STATES PATENT OFFICE 2,557,426

TAB ACTUATING MECHANISM

Thomas C. George, North Hollywood, Calif., assignor to Lockheed Aircraft Corporation, Burbank, Calif.

Application January 13, 1950, Serial No. 138,432

11 Claims. (Cl. 244—82)

1

This invention relates to aircraft control devices and relates more particularly to tab actuating mechanisms for automatically differentially controlling a trailing tab or flap with respect to a movable control surface element with which it is associated.

Various systems and mechanisms have been introduced for operating and controlling the flaps or tabs mounted at the rear edges of control airfoils such as rudders, elevators and ailerons. The prior mechanisms have been such that the tabs may be set or operated by the pilot during flight and in other devices the tab has been actuated to act either as a servo means to assist in the control of the principal control airfoil or as an anti-servo means. However, so far as I am aware such earlier tab actuating mechanisms have not provided for automatic anti-servo tab motion throughout the neutral range of movement of the control surface or airfoil and for automatic servo motion of the tab throughout the larger control surface angles or movements.

It is, therefore, one object of the invention to provide a control mechanism for a tab which effects the automatic differential movement of the tab in the anti-servo directions during the neutral motion of the aileron, rudder, or other control surface to obtain control surface centering characteristics and control surface "feel" throughout the neutral range of motion and which also automatically effects differential motion of the tab in the servo directions throughout the larger control surface angular throws or movements to obtain desirable lighter or reduced control forces.

Another and important object of the invention is to provide a tab actuating mechanism of this character that may be constructed or adjusted to produce anti-servo motion of the tab through any required or selected range of aileron or control surface movement at any desired or required rate of anti-servo differential motion and beyond this range of control surface movement, which may be termed the "neutral" range, the mechanism is operable to produce servo motion of the tab of any desired value, the latter or servo motion of the tab being obtained at both sides of the neutral range. Thus the mechanism is adapted to automatically produce anti-servo and servo motion of the tab at the rates and throughout the ranges required for a given aircraft in which it is to be employed.

It is another object of the invention to provide an anti-servo and servo tab actuating mechanism of the character mentioned embodying

2 means for effecting trim adjustments or regulation of the tab which means may either be controllable from the cockpit or operated when the airplane is on the ground.

A further object of the invention is to provide a tab actuating mechanism of this class that is extremely simple, inexpensive and light in weight.

A still further object of the invention is to provide a compact tab actuating mechanism associated with the control surface and with a relatively stationary structure of the aircraft in such a manner that motion of the control surface automatically produces the differential motion of the tab in the anti-servo and servo directions without the necessity of providing special control systems. In fact, the tab actuating mechanism of the invention may be such that it is entirely confined within the control surface element and the immediately adjacent stationary structure of the aircraft.

Other objectives and features of the invention will become apparent from the following detailed description of typical preferred embodiments throughout which description reference is made to the accompanying drawings in which:

Figure 1 is a more or less diagrammatic view of the tab actuating mechanism of the invention illustrating the control surface and tab in unactuated positions;

Figure 2 is a view similar to Figure 1 showing the control surface actuated in the neutral range with the tab in an anti-servo position;

Figure 3 is a view similar to Figure 1 showing the control surface operated beyond the neutral range with the tab in the servo position;

Figure 4 is a view similar to Figure 2 with the control surface actuated in the other direction in the neutral range and illustrating the tab in an anti-servo position;

Figure 5 is a view similar to Figure 3 showing the control surface actuated beyond the neutral range in the other direction with the tab in a servo position;

Figure 6 is an enlarged longitudinal detailed sectional view of the anti-servo rod assembly of the mechanism illustrated in Figures 1 to 5 inclusive, showing the end portions of the assembly in side elevation;

Figure 7 is a view similar to Figure 1 illustrating another form of tab actuating mechanism of the invention;

Figure 8 is an enlarged fragmentary vertical sectional view taken substantially as indicated by line 8—8 on Figure 7 illustrating the slack connection of the servo rod, with the end of the rod assembly appearing in elevation; and Figure 9 is a view similar to Figure 1 illustrating still another form of tab actuating mechanism of the invention.

The mechanisms of the invention are, of course, capable of modification to adapt them for special applications. However, as above pointed out, the mechanisms are adapted to be conditioned or constructed to provide for practically any required ratio of differential movement of the tab through any required ranges of angular motion of the control surface so that the mechanisms are suitable for use in practically any aircraft. Accordingly, the invention is not to be construed as limited or restricted to the particular embodiments about to be described or for use with any given class or type of aircraft.

Figures 1 to 6 inclusive illustrate the invention associated with a control surface or airfoil 10 mounted on a relatively stationary structure 11 of the aircraft for movement about an axis 12. The control surface 10 may be a rudder, elevator, or aileron and in the typical case illustrated it may be considered that the relatively fixed structure or surface 11 is a wing and that the movable surface 10 is an aileron. The present invention is not primarily concerned with the means for mounting the surface 10 or with the mechanism for moving the same and it may be assumed that conventional mounting and control mechanisms are employed. I have shown an operating or control rod 9 connected with the shaft or hinge pin 12 of the surface 10 through the medium of a lever 8, it being understood that this is only one typical way of operating the surface 10. The tab 13 is arranged at the trailing edge of the control surface 10 and is mounted at a hinge 14 in such a manner as to have angular movement relative to the surface 10 in both directions from the neutral position shown in Figure 1.

The tab actuating mechanism of Figures 1 to 6 inclusive includes an adjustable normally stationary mounting or anchorage means 15; and an anti-servo link or rod assembly 16 and a servo link or rod means 17 connected between the anchorage 15 and the hinged tab 13 to produce differential movement of the tab upon angular movement of the control surface 10.

The anchorage means 15 is located in or adjacent the forward portion of the control surface 10 and serves to provide points of attachment of the rod assembly 16 and rod means 17 to the wing 11. The means 15 may comprise one or more plates disposed in a plane normal to the axis 12 of the control surface 10. In the drawings I have shown the means 15 secured to a tab plate 18, or the equivalent, connected with the wing structure 11 through the medium of a trim adjustment mechanism. The anchor means 15 may be spaced a short distance forwardly from the control surface axis of movement 12 and has an upwardly extending servo arm 20 and a downwardly extending anti-servo arm 21. The arm 20 projects a considerable distance above the central longitudinal plane or axis which intersects the axis 12 and the arm 21 projects a somewhat shorter distance below that horizontal plane or axis. As will be described below the arms 20 and 21 provide fulcrums or points of anchorage for the respective links or rods 16 and 17. The trim adjustment mechanism mentioned above may be a screw thread type actuator including a rotatable screw 70 and a traveling nut 71 on the screw. The screw 70 may be rotated by a suitable control extending to the pilot's compartment or may be rotated when the aircraft is at rest. The nut 71 is secured to the tab plate 18 and is guided in a sleeve or tube 19 fixed to the wing structure 11. A lug 72 on the nut 71 operates in a slot in the tube 19 to prevent rotation of the nut. It will be seen that upon rotation of the screw 70 the plate 18 is moved either fore or aft to change or adjust the position of the anchor arms 20 and 21.

The anti-servo rod assembly 16 is connected between the anchorage means 15 and the tab 13 and is operable to produce anti-servo motion of the tab during movement of the control surface 10 in the neutral range, that is it causes movement of the tab 13 in the same sense or direction as the surface 10 but at a greater rate. In accordance with the invention, the rod assembly 16 is contractible and extensible, being contractible to allow the servo rod 17 to come into play to produce servo motion of the tab 13 when the control surface 10 is moved beyond the neutral range and being extensible to its original length to again cause anti-servo motion of the tab 13 upon subsequent movement of the surface 10 in the neutral range. In the typical preferred embodiment of the invention illustrated, the anti-servo rod assembly 16 is a spring-loaded telescopic structure including a rod 22 slidably received in a tube 23. The rod 22 may be the rear element of the assembly, in which case it has an end fitting 24 pivotally or hingedly connected with an arm 25 fixed to the tab 13. The end fitting 24 is adjustably screw-threaded into the rear end of the rod 22 and the rod and tube are adapted to be locked in the adjusted relation by a lock nut 26. A suitable bearing 27 may be provided in the end fitting 24 to cooperate with the pivotal connection at the tab arm 25. The rod 22 enters the rear end of the tube 23 and may extend a considerable distance into the tube. The forward end of the tube 23 is pivotally connected with the above described anchorage arm 21 at the axis 28 and is preferably provided with an end fitting 29 similar to the fitting 24 just described. The fitting 29 is adjustably screw-threaded in the end of the tube 23 and may be set or locked in the adjusted position by a lock nut 30. It will be seen that by adjusting the end fittings 24 and 29 the uncompressed effective length of the rod assembly 16 may be varied or changed at will.

A coiled or helical compression spring 31 is arranged around the tube 23 and its ends bear against collars 32 which are slidable on the tube. Each collar 32 carries a pin 33 which extends radially or transversely through a slot 34 in the tube 23 and a registering slot 35 in the rod 22. The spring 31 is confined under compression between the collars 32 and holds the pins 33 against the outer ends of their respective slots 34 and 35. Thus the spring 31 tends to hold the rod assembly 16 at a constant length and is compressible upon the application of axial compression or tension forces to the assembly 16 to allow the assembly to contract or extend axially. Of course upon removal of such axial forces the spring 31 restores the rod assembly 16 to its normal length.

The rod assembly 16 may include means for preventing icing of the telescopic parts. As illustrated this means includes an outer tube 36 spaced around the spring 31 and the adjacent portions of the rod 22 and tube 23. A collar 37 is provided in one end of the tube 36 to engage around the tube 23 and a screw 38 secures the collar and tubes together. A collar or bushing 39 is secured in the other end of the tube 36 which slidably engages around the rod 22. The protective tube 36 may be packed with a suitable grease and the collars 37 and 39 are provided with sealing rings 40 to prevent the leakage of the grease or lubricant from the assembly.

The servo link or rod 17 is provided to cause servo motion of the tab 13 when the control surface 10 is moved beyond the neutral range in either direction. In Figures 1 to 6 of the drawings, the servo rod 17 is connected between the above described anchor arm 20 and the rod 22. The rod 17 is an elongate member provided at its forward end with an adjustably threaded end fitting 41 having a hinged or pivotal connection at the axis 42 with the anchor arm 20. In practice, the fitting 41 may be similar to the above described fittings 24 and 29 of the anti-servo rod assembly 16 and may be set or locked in the adjusted position in the same manner. The rear end of the servo push rod 17 is connected with the anti-servo rod assembly 16. In accordance with the invention, one end of the rod 17 has a slack connection or lost motion connection with its associated part. The rod 17, as illustrated in the drawings, is provided at its rear end with a fitting 43 which has an axially extending slot 45 slidably or shiftably receiving a pin 46 on the rod 22. This forms the lost motion or slack connection between the servo and anti-servo rod elements. The slotted end fitting 43 preferably has an adjustable screw-threaded connection with the rod 17 and it is desirable to make the threads of the two end fittings 41 and 43 of opposite hand, that is to make the threads of one fitting right hand and the threads of the other fitting left hand so that the length of the servo push rod 17 may be accurately regulated or adjusted. The length of the slot 45 may be substantial and where the tab 43 is to be aligned with the control surface 10 when both elements are in the unactuated position of Figure 1, the parts are related so that the pin 46 is substantially mid-way between the ends of the slot under these conditions. As will later become apparent, the length of the slot 45 determines the range of anti-servo motion of the tab 13, that is it determines the extent of movement of the control surface 10 that is accompanied by anti-servo movement of the tab 13. The position or location of the slot 45, as effected by axial adjustment of the rod 17, or its fitting 43, locates or determines the portion of movement of the control surface 10 that will be accompanied by anti-servo tab motion.

In operation of the mechanism illustrated in Figures 1 to 6 inclusive, it will be assumed that the pin 46 is substantially mid-way between the ends of the slot 45 when the control surface 10 and tab 13 are in the aligned positions of Figure 1. The spring 31 holds the pins 33 against the outer ends of the slots 34 and 35 at this time. Upon movement of the control surface 10 upwardly, as viewed in the drawings, through what I have termed the neutral range, the anti-servo rod assembly 16 functions to cause anti-servo motion of the tab 13, that is it causes the tab 13 to hinge or move in the same direction as the control surface but at a more rapid rate. Thus while the control surface 10 moves about its hinge line or axis 12 during this upward movement in the neutral range, the rod assembly 16 remains unyielding and hinges or pivots about the axis 28. The rod assembly 16 is connected to the arm 25 of the tab 13 to restrain the tab in such a manner that it is caused to hinge upwardly relative to the control surface 10 as the latter moves upwardly. This will be apparent from an inspection of Figure 2 where the broken lines illustrate the initial positions of the parts and where the full lines illustrate the positions assumed after actuation through the neutral range in the upward direction. It will be observed from Figure 2 that the pin 46 has reached the forward end of the slot 45. The engagement of the pin 46 with the forward end of the slot 45 serves to limit the anti-servo motion of the tab 13.

Movement of the control surface 10 beyond the neutral range is accompanied by servo motion of the tab 13. When the control surface 10 is moved from the full line position of Figure 2 to the full line position of Figure 3, the tab 13 is caused to hinge downwardly relative to the control surface. The engagement of the pin 46 with the forward end of the slot 45 terminates the anti-servo motion of the tab 13 and brings the servo rod 17 into play. It will be seen from Figure 3 that the pin 46 engaging the forward end of the slot 45 positively holds the rod 22 of the anti-servo rod assembly 16 against forward motion that would otherwise accompany the arcuate or swinging movement of the control surface 10 and causes the rod 22 and the rod 17 to, in effect, constitute a single push rod which pivots or hinges about the axis 42. This push rod 17—22 restrains the tab 13 during movement of the control surface 10 beyond the neutral range in such a manner that the tab is hinged downwardly relative to the control surface 10 as the latter hinges upwardly. During this action the anti-servo rod assembly 16 extends, the spring 31 yielding or compressing so that the forward pin 33 moves rearwardly in the forward slot 34. From the foregoing it will be seen that the effective axis of the tab actuating mechanism during movement of the control surface in the neutral range is the axis 28 and that during movement of the surface 10 beyond the neutral range the axis 42 becomes the effective axis of the tab operating means.

The full lines of Figure 4 illustrate the relative positions assumed by the parts when the control surface 10 is moved downwardly in the neutral range. When the control surface 10 is moved in the neutral range from the broken line position of Figure 4 to the full line position, the anti-servo rod assembly 16 hinges about the axis 28 and being connected with the tab arm 25 causes the tab 13 to swing downwardly relative to the surface 10, that is it produces a differential movement of the tab. Such motion is accompanied by rearward movement of the pin 46 in its slot 45, and the engagement of the pin with the rear wall of its slot terminates the anti-servo motion of the tab 13. Continued movement of the control surface 10 in the downward direction, for example from the full line position of Figure 4 to the full line position of Figure 5, is accompanied by servo movement of the tab 13. Because the pin 46 is in engagement with the rear wall of the slot 45 at this time the effective axis of the tab actuating mechanism is shifted to the axis 42 and the rod 22 and the servo rod 17 act as a single tab control or tab actuating rod constraining the tab 13 to hinge upwardly relative to the control surface 10 during the downward movement of the latter. At the same time the contractible anti-servo rod assembly 16 contracts axially, the spring 31 being compressed and the rod 22 moving rearwardly into the tube 23 so that the rearward pin 33 moves forwardly in the rear slot 35. Here again it will be observed that the effective hinge or axis of the tab actuating mechanism shifts from the point or axis 28 to the axis 42 when the control surface 10 is moved from the neutral range to a greater angle.

In Figures 7 and 8 I have illustrated another form of the invention in which the anchor means 15 and the anti-servo rod assembly 16 may be substantially the same as described above. This mechanism is characterized by a servo rod 50 that is pivotally connected with the tab arm 25 at the same hinge pin 51 as the assembly 16. The rear end of the rod 50 has an adjustably threaded fitting 52 cooperating with the hinge pin 51 to connect the rod with the tab arm 25. In this construction the lost motion connection is provided between the servo rod 50 and the arm 20 of the anchor means 15. As best illustrated in Figure 8, this connection includes relative large openings 53 in the arm 20. The adjustable end fitting 54 of the rod 50 has a transverse shaft or pin 55 provided with bushings 56. The pin 55 passes through the openings 53 and carries large side plates or washers 57 which cooperate with the outer surfaces of the plate 20 to prevent displacement of the pin from the openings. As seen in Figure 8, the openings 53 are considerably larger in diameter than the bushings 56 of the pin providing the lost motion connection between the rod 50 and the anchor arm. The operation of the mechanism of Figures 7 and 8 is the same as described above except that the lost motion for determining the limits of the anti-servo tab movement occurs at the shaft and opening connection 53—55 just described instead of at the pin and slot connection 44 and 45.

Figure 9 illustrates still another embodiment of the invention. In this construction the servo rod 50 may be the same as in Figures 7 and 8, having its rear end adjustably and pivotally connected with the tab arm 25. The forward end of the rod 50 has the lost motion connection 80 with the anchor arm 20, the connection being of the pin and slot type similar to the above described connection 45—46. The mechanism of Figure 9 is characterized by a contractible and extensible telescopic spring loaded anti-servo rod assembly 16' connected between the anchor arm 21 and a point on the servo rod 50 intermediate the ends of the latter rod. The assembly 16' may be the same as the assembly 16 described in detail above except that its rod 22' has an axially adjustable pivotal connection 60 with the servo rod 50. The mechanism of Figure 9 operates in the same manner as the other arrangements of the invention, serving or operating to produce anti-servo motion of the tab 13 during movement of the control surface 10 in both directions through the neutral range and operating to cause servo motion of the tab 13 during movement of the control surface 10 through the larger angles.

From the foregoing it will be seen that I have provided simple, practical and fully automatic mechanisms for causing anti-servo motion of a flap or tab during movement of a control surface through the smaller angles or in the neutral range and causing servo motion of the flap or tab during movement of the control surface beyond such neutral range. As above described, the mechanism is adjustable to provide for anti-servo motion of the tab 13 throughout any desired extent of neutral range motion of the control surface and in any given or selected portion of the control surface motion.

Having described only typical forms of the invention I do not wish to be limited to the specific details herein set forth, but wish to reserve to myself any variations or modifications that may appear to those skilled in the art and fall within the scope of the following claims.

I claim:

1. In an aircraft having a control surface hinged adjacent its forward edge to the aircraft for movement about a given axis, the combination of a tab hinged to the trailing edge portion of the control surface, a first rod means, a second rod means, the first rod means being extensible and contractible, an operative connection between the first rod means and the tab, a pivotal connection between the forward end of the first rod means and the aircraft at an axis spaced at one side of said given axis, a pivotal connection between the forward end of the second rod means and the aircraft at an axis spaced at the other side of said given axis, and an operative connection between the rear end of the second rod means and the tab, the connection at one end of the second rod means permitting limited lost motion whereby the first rod means serves to cause pivoting of the tab relative to the control surface in the anti-servo direction during initial movements of the latter to take up the lost motion of said connection whereupon the second rod means serves to cause pivoting of the tab relative to the control surface in the servo direction.

2. In an aircraft having a control surface hinged adjacent its forward edge to the aircraft for movement about a given axis and having a tab hinged on its trailing edge portion, the combination of an anti-servo rod assembly operatively connected at one end with the tab and pivotally connected at its other end with the aircraft at a point spaced at one side of said given axis so that the anti-servo rod assembly hinges the tab relative to the control surface in the anti-servo directions during limited angular movements of the control surface, the anti-servo rod assembly including spring-loaded relatively movable parts to be contractible and extensible in the axial direction, a servo rod, an operative connection between the servo rod and the tab, and a connection between the servo rod and a point on the aircraft spaced at the other side of said given axis, one of said connections of the servo rod being a lost motion connection to allow said anti-servo movement and operable upon angular movement of the control surface beyond said limited movement to cause the servo rod to hinge the tab relative to the control surface in the servo directions.

3. In an aircraft having a control surface hinged adjacent its forward edge to the aircraft for movement about a given axis and having a tab hinged on its trailing edge portion, the combination of an anti-servo rod assembly operatively connected at one end with the tab and pivotally connected at its other end with the aircraft at a point spaced at one side of said given axis so that the anti-servo rod assembly hinges the tab relative to the control surface in the anti-servo directions during limited angular movements of the control surface, the anti-servo rod assembly being contractible axially upon the application of a substantial axial compression load, a servo rod having a pivotal connection with the aircraft at a point spaced at the other side of said given axis and having an operative pivotal connection with the tab, one of said pivotal connections of the servo rod being a lost motion connection to allow said anti-servo rod assembly to hinge the tab in the anti-servo directions during hinging of the control surface through a limited range and to cause the servo rod to hinge the tab in the servo directions while causing contraction or extension of the anti-servo rod assembly.

4. In an aircraft having a control surface hinged adjacent one edge to the aircraft to move about a given axis and having a tab hinged on its opposite edge, mechanism for causing anti-servo and servo motion of the tab relative to the control surface upon movement of the control surface about said given axis, said mechanism including a first rod means hinged to the aircraft at a point spaced at one side of said axis and coupled with the tab to hinge the same relative to the control surface and in the same direction as the control surface during hinging of the control surface through a limited range, and a second rod means having one end coupled with the tab and having its other end hinged to the aircraft at a point spaced at the other side of said axis to move the tab relative to the control surface in the opposite direction to the movement of the control surface when the control surface is moved beyond said limited range, said second rod means having lost motion to allow said operation of the tab by the first rod means and the first rod means being extensible and contractible to allow said operation of the tab by said second rod means after said lost motion is taken up.

5. In an aircraft having a control surface hinged adjacent one edge to the aircraft to move about a given axis and having a tab hinged on its opposite edge, mechanism for causing anti-servo and servo motion of the tab relative to the control surface upon movement of the control surface about said given axis, said mechanism including a first rod means hinged to the aircraft at a point spaced at one side of said axis and coupled with the tab to hinge the same relative to the control surface and in the same direction as the control surface during hinging of the control surface through a limited range, the first rod means including an extensible and contractible rod assembly and spring yieldingly resisting extension and contraction of the assembly during movement of the control surface through said limited range, a second rod means having one end hinged to the aircraft at a point spaced at the other side of said axis and a lost motion coupling between the tab and the other end of the second rod means allowing said movement of the tab and limiting such movement so that movement of the control surface beyond said limited range overcomes the resistance of the spring means and brings the second rod means into play to hinge the tab in servo direction.

6. In an aircraft having a control surface hinged adjacent one edge to the aircraft to move about a given axis and having a tab hinged on its opposite edge, mechanism for causing anti-servo and servo motion of the tab relative to the control surface upon movement of the control surface about said given axis, said mechanism including an anti-servo rod means hinged to the aircraft at one side of said axis and operatively connected with the tab to hinge the same relative to the control surface in the anti-servo directions upon movement of the surface through a limited range, a servo rod hinged to the aircraft at a point spaced at the other side of said axis, and a lost motion connection between said rod means and the servo rod allowing said hinging of the tab and operable to limit such hinging so that the servo rod hinges the tab in the servo directions upon movement of the control surface beyond the limits of said range, the anti-servo rod means comprising a spring loaded contractible and extensible assembly which contracts and extends during said servo movements of the tab.

7. In an aircraft having a control surface hinged adjacent one edge to the aircraft to move about a given axis and having a tab hinged on its opposite edge, mechanism for causing anti-servo and servo motion of the tab relative to the control surface upon movement of the control surface about said given axis, said mechanism including an anti-servo rod means hinged to the aircraft at one side of said axis and operatively connected with the tab to hinge the same relative to the control surface in the anti-servo directions upon movement of the surface through a limited range, a servo rod hinged to the aircraft at a point spaced at the other side of said axis, and a lost motion connection between said servo rod and the tab allowing said hinging of the tab and operable to limit such hinging so that the servo rod hinges the tab in the servo directions upon movement of the control surface beyond the limits of said range, the anti-servo rod means comprising a spring loaded contractible and extensible assembly which contracts and extends during said servo movements of the tab.

8. In an aircraft having a control surface hinged adjacent one edge to the aircraft to move about a given axis and having a tab hinged on its opposite edge, mechanism for causing anti-servo and servo motion of the tab relative to the control surface upon movement of the control surface about said given axis, said mechanism including an anti-servo rod means hinged to the aircraft at one side of said axis and operatively connected with the tab to hinge the same relative to the control surface in the anti-servo directions upon movement of the surface through a limited range, a servo rod hinged to the aircraft at a point spaced at the other side of said axis, adjusting means for varying the effective length of the servo rod, and a lost motion connection between said rod means and the servo rod allowing said hinging of the tab and operable to limit such hinging so that the servo rod hinges the tab in the servo directions upon movement of the control surface beyond the limits of said range, the anti-servo rod means comprising a spring loaded contractible and extensible assembly which contracts and extends during said servo movements of the tab.

9. In an aircraft having a control surface hinged adjacent its forward edge to the aircraft for movement about a given axis and having a tab hinged on its trailing edge portion, the combination of an anti-servo rod assembly operatively connected at one end with the tab and pivotally connected at its other end with the aircraft at a point spaced at one side of said given axis so that the anti-servo rod assembly hinges the tab relative to the control surface in the anti-servo directions during limited angular movements of the control surface, the anti-servo rod assembly being contractible axially upon the application of a substantial axial compression load, a servo rod having a pivotal connection with the aircraft at a point spaced at the other side of said given axis and having an operative pivotal connection with the tab, one of said pivotal connections of the servo rod being a lost motion connection to allow said anti-servo rod assembly to hinge the tab in the anti-servo directions during hinging of the control surface through a limited range and to cause the servo rod to hinge the tab in the servo directions while causing contraction of the anti-servo rod assembly, and means for adjusting the position of the lost motion connection to regulate the location of the portion of the movement of the control surface which is accompanied by anti-servo motion of the tab.

10. In an aircraft having a control surface hinged adjacent one edge to the aircraft to move about a given axis and having a tab hinged on its opposite edge, mechanism for causing anti-servo and servo motion of the tab relative to the control surface upon movement of the control surface about said given axis, said mechanism including a first rod means, a hinge connection between one end of the first rod means and the aircraft located at a point spaced at one side of said axis, a hinge connection between the other end of the first rod means and the tab, an anti-servo rod means hinged to the aircraft at a point spaced at the other side of said axis and coupled with the first rod means at a point intermediate its ends to cause anti-servo movement of the tab during limited motion of the control surface, the first named hinge connection having lost motion to allow said anti-servo motion and limiting the same so that the first rod means causes servo motion of the tab upon movement of the control surface beyond said limited motion, the anti-servo rod being contractible and extensible to allow said servo motions of the tab.

11. In an aircraft having a control surface hinged adjacent its forward edge to the aircraft for movement about a given axis and having a tab hinged to its trailing edge portion for movement about another given axis, the combination of an extensible and contractible anti-servo rod means, a servo rod means, pivotal connections between the forward ends of the respective rod means and the aircraft at one end of said surface and pivotal connections between the rear ends of the respective rod means and the tab at the other end of said surface, said connections at one end of said surface being spaced at the opposite sides of the central longitudinal axis of said surface, and the pivotal connection at one end of said servo rod means being a lost motion connection.

THOMAS C. GEORGE.

REFERENCES CITED

The following references are of record in the file of this patent:

UNITED STATES PATENTS

| Number | Name | Date |
| --- | --- | --- |
| 1,574,567 | Flettner | Feb. 23, 1926 |
| 2,357,465 | Focht | Sept. 5, 1944 |
| 2,435,922 | Davis | Feb. 10, 1948 |

FOREIGN PATENTS

| Number | Country | Date |
| --- | --- | --- |
| 402,941 | Great Britain | Dec. 14, 1933 |
| 595,298 | Great Britain | Dec. 2, 1947 |